(12) United States Patent
Chen (10) Patent No.: US 6,954,232 B2
(45) Date of Patent: Oct. 11, 2005

(54) METHOD FOR CONTROLLING A CHARGE-COUPLED DEVICE SENSING MODULE

(75) Inventor: Michael Chen, Hsinchu (TW)

(73) Assignee: Avision Inc., Hsinchu (TW)

( * ) Notice: Subject to any disclaimer, the term of this patent is extended or adjusted under 35 U.S.C. 154(b) by 718 days.

(21) Appl. No.: 09/985,095

(22) Filed: Nov. 1, 2001

(65) Prior Publication Data

US 2002/0054230 A1 May 9, 2002

(30) Foreign Application Priority Data

Nov. 4, 2000 (TW) .......................... 89123320 A (51) Int. Cl.[7] .......................... H04N 3/14; H04N 1/04
(52) U.S. Cl. .......................... 348/324; 348/294; 358/483
(58) Field of Search .......................... 348/324, 294, 348/362, 264; 358/483, 513, 514

(56) References Cited

U.S. PATENT DOCUMENTS

| | | | | |
|---|---|---|---|---|
| 4,712,137 A | * | 12/1987 | Kadekodi et al. | 348/316 |
| 5,025,318 A | * | 6/1991 | Nagura | 348/316 |
| 5,452,001 A | * | 9/1995 | Hosier et al. | 348/230.1 |
| 5,917,620 A | * | 6/1999 | Hasegawa et al. | 358/513 |
| 6,166,831 A | * | 12/2000 | Boyd et al. | 358/483 |
| 6,576,938 B1 | * | 6/2003 | Hirama et al. | 257/233 |
| 6,798,454 B1 | * | 9/2004 | Kashiwagi et al. | 348/324 |

* cited by examiner

Primary Examiner—James J. Groody
Assistant Examiner—Lin Ye
(74) Attorney, Agent, or Firm—Rabin & Berdo, P.C.

(57) ABSTRACT

A method for controlling a charge-coupled device (CCD) sensing module. The CCD sensing module includes photosensors divided into two sets of photosensors including a first set of photosensors and a second set of photosensors. First, the first set of photosensors and the second set of photosensors are exposed, and first signal charges obtained from the first set of photosensors and second signal charges obtained from the second set of photosensors are stored into a CCD shift register unit. Then, the first signal charges and the second signal charges stored in the CCD shift register unit are sequentially shifted to a charge receiving unit and an image signal corresponding to the first signal charges is acquired. After that, the first set of photosensors and the second set of photosensors are exposed, and the first signal charges obtained from the first set of photosensors and the second signal charges obtained from the second set of photosensors are stored into the CCD shift register unit. Finally, the first signal charges and the second signal charges stored in the CCD shift register unit are shifted to the charge receiving unit and an image signal corresponding to the second signal charges is acquired.

7 Claims, 7 Drawing Sheets

METHOD FOR CONTROLLING A CHARGE-COUPLED DEVICE SENSING MODULE

This application incorporates by reference Taiwanese application Ser. No. 89123320, filed Nov. 4, 2000.

BACKGROUND OF THE INVENTION

1. Field of the Invention

The invention relates in general to a method of controlling charge-coupled device sensing module, and more particularly to a method of controlling a charge-coupled device sensing module for use in a scanning apparatus.

2. Description of the Related Art

In an image scanning apparatus, a charge-coupled device (CCD) is used to acquire optical signals representing images scanned, convert the optical signals into image signals, and output the image signals to an analog signal processing circuit for further image signal processing in the next stage. In order to achieve image scanning with high resolution, a high resolution imager employing a staggered sensor structure is disclosed in U.S. Pat. No. 4,438,457. In addition, CCD sensing modules employing the staggered sensor structure have been widely utilized in the industry.

Figure 1:
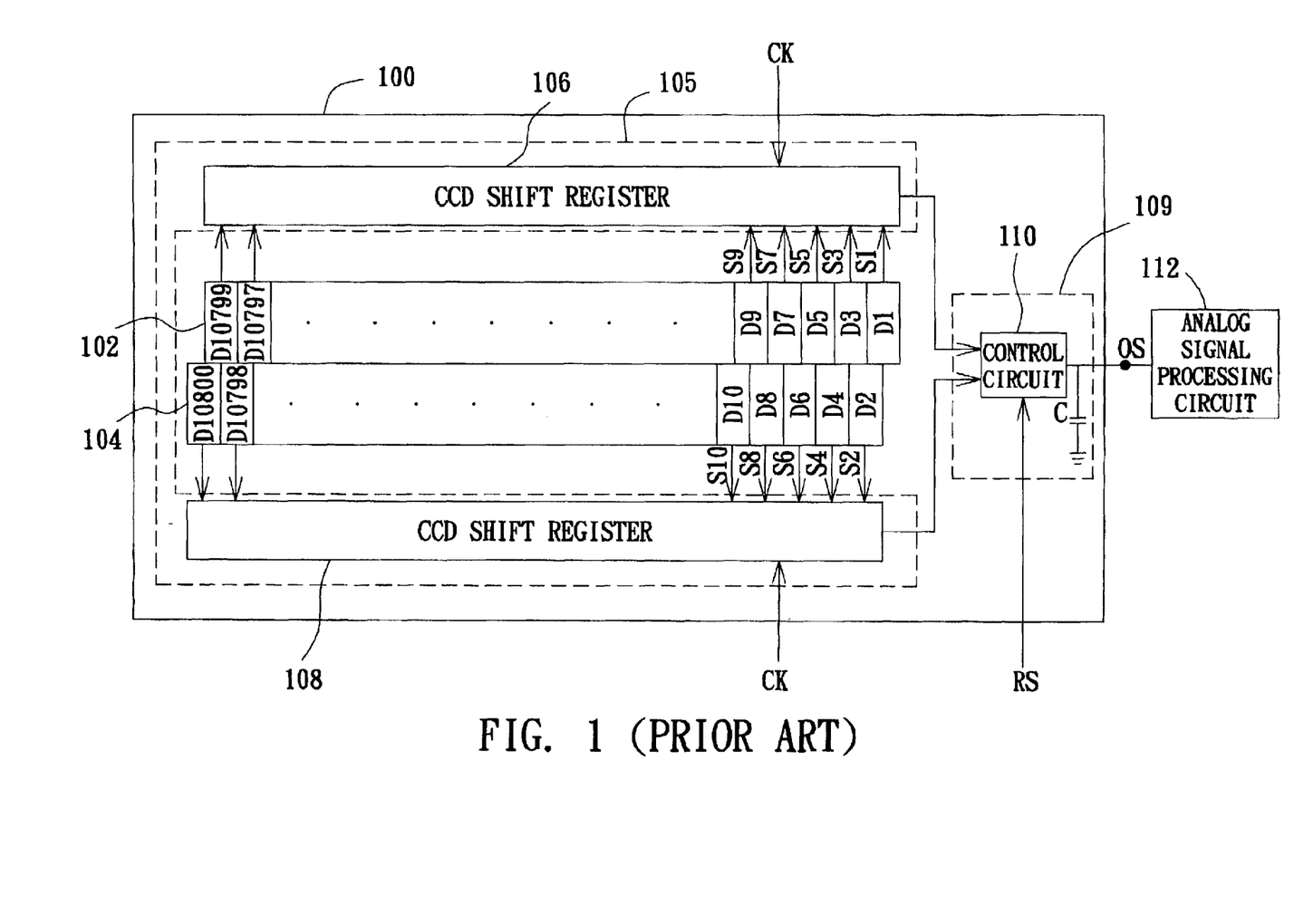
FIG. 1 (Prior Art) is a block diagram illustrating a CCD sensing module employing a conventional staggered sensor structure.

Referring to FIG. 1, it illustrates a CCD sensing module 100 employing the conventional staggered sensor structure. The CCD sensing module 100 provides a resolution of 600 dots per inch (dpi) for each row of its structure and has a width of nine inches, thereby allowing high resolution scanning, for example, scanning with a resolution of 1200 dpi. The CCD sensing module 100 includes a set of odd-numbered photosensors 102 and a set of even-numbered photosensors 104. The set of odd-numbered photosensors 102 includes photosensors D1, D3, . . . , D10799 while the set of even-numbered photosensors 104 includes photosensors D2, D4, . . . , D10800. The locations of the photosensors of the set of odd-numbered photosensors 102 and the set of even-numbered photosensors 104 are staggered. Each of the photosensors D1 to D10800 corresponds to an image signal of a pixel. During scanning an image, when the CCD sensing module 100 is exposed to light, the set of odd-numbered photosensors 102 and the set of even-numbered photosensors 104 detect optical signals corresponding to the image and generate signal charges referred to as Sn respectively, where n is a number equal to the corresponding photosensor Dn. That is, the photosensors D1, D3, . . . , D10799 and the photosensors D2, D4, . . . , D10800 generate signal charges S1, S3, . . . , S10799 and S2, S4, . . . , S10800 respectively. In addition, the signal charges S1, S3, . . . , S10799 and S2, S4, . . . , S10800 are simultaneously transmitted, in parallel, to a CCD shift register unit 105 via a shift gate (not shown). When the signal charges S1 to S10800 are completely sent to the CCD shift register unit 105, a next exposure of the CCD sensing module 100 can be made.

The CCD shift register unit 105 includes CCD shift registers 106 and 108. The signal charges S1, S3, . . . , S10799 and S2, S4, . . . , S10800 are sent to the CCD shift registers 106 and 108 respectively. For one of the signal charges, it can be denoted as signal charge S.

Controlled by a clock signal CK, the CCD shift register 106 feeds the signal charges S1, S3, . . . , S10799 serially into a charge receiving unit 109. Similarly, the CCD shift register 108 feeds the signal charges S2, S4, . . . , S10800 serially into the charge receiving unit 109. In this way, the signal charges S1, S3, . . . , S10799 and S2, S4, . . . , S10800 are alternately inputted to the charge receiving unit 109. The charge receiving unit 109 includes a control circuit 110 and a charge receiver such as an output capacitor C. The signal charges S1, S3, . . . , S10799 and S2, S4, . . . , S10800 are fed into the output capacitor C via the control circuit 110 so that the output capacitor C receives the signal charges S1, S2, S3, S4, . . . , S10799 and S10800 in sequence. The CCD sensing module 100 outputs the voltage across the output capacitor C as its output signal OS. The output signal OS is an analog signal representing pixels corresponding to the scanned image and is outputted to an analog signal processing circuit 112 in the next stage for further image signal processing.

Figure 2:
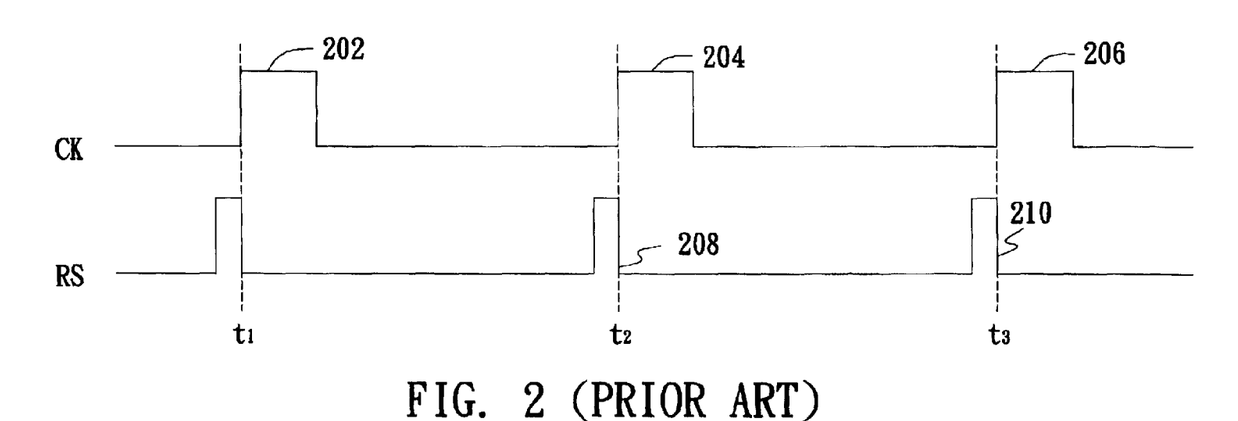
FIG. 2 (Prior Art) shows waveform diagrams of a conventional clock signal and reset signal for controlling the CCD sensing module 100 in FIG. 1.

Referring to FIG. 2, it illustrates a clock signal and reset signal conventionally for controlling the CCD sensing module 100 in FIG. 1. The clock signal CK is used to control the CCD shift registers 106 and 108. On receiving a clock pulse of the clock signal CK, the CCD shift registers 106 and 108 alternately output a signal charge S to the output capacitor C. For example, at time $t_1$, a clock pulse 202 is applied to the CCD shift registers 106 and 108, and the CCD shift register 106 outputs the signal charge S1 to the output capacitor C, thereby generating a corresponding image signal. Next, before the next clock pulse 204 is applied to the CCD shift registers 106 and 108, a reset pulse 208 of the reset signal RS is applied to the control circuit 110 of the CCD sensing module 100 to reset the output capacitor C, i.e., to completely discharge the output capacitor C so as to receive a next signal charge S.

At time $t_2$, the clock pulse 204 is applied to the CCD shift registers 106 and 108, and the CCD shift register 108 outputs the signal charge S2 to the output capacitor C, thus generating a corresponding image signal. A reset pulse 210 is then applied to the CCD sensing module to reset the output capacitor C. At time $t_3$, a clock pulse 206 is applied to the CCD shift registers 106 and 108, and the CCD shift register 106 outputs the signal charge S3 to the output capacitor C so that an image signal corresponding to the signal charge S3 is generated. In this way, by repeating the same operation as above, the signal charges S4, S5, . . . , S10800 are sequentially outputted to the output capacitor C, thus generating corresponding image signals. After all of the signal charges outputted from the CCD shift registers 106 and 108 are fed into the output capacitor C, the CCD shift registers 106 and 108 are ready to receive signal charges generated by the CCD sensing module 100 in the next exposure.

For the clock signal CK, its adjacent clock pulses are generally required to be at least 1 $\mu$s ($10^{-6}$ sec) apart so that the output signal OS has enough stable periods for the analog signal processing circuit 112 to acquire the signal representative of the scanned image from the output signal OS. For the CCD sensing module 100 with two sets of 5400 photosensors, totally 10800 photosensors, it uses at least 10800×1 $\mu$s=10.8 ms to completely output the signal charges S1 to S10800 generated by the set of odd-numbered photosensors 102 and the set of even-numbered photosensors 104, and to obtain required image signals. In order to allow the analog signal processing circuit to have enough process time to avoid improper operation, the conventional approach is to set an optimal exposure time for the CCD sensing module 100 to be 16 ms and to allow the CCD shift registers 106 and 108 to perform shifting signal charges and outputting the signal charges to the output capacitor C.

When the optimal exposure time for the CCD sensing module 100 is set to 16 ms, it is required to select a light tube with reduced brightness or a suitable light tube, so that the CCD sensing module 100 obtains an optional amount of exposure or a maximum signal-to-noise ratio, thereby minimizing the effect of the noise. However, if the brightness of the light tube is inappropriate, over-exposure may occur and the photosensors are to be saturated with charges, thereby degrading the quality of the image.

When the CCD sensing module 100 is used to perform low resolution scanning, such as 600 dpi scanning, the operation is as follows. First, the CCD sensing module 100 is exposed to light so that the photosensors D1 to D10800 generate signal charges S1 to S10800. Secondly, the signal charges S1 to S10800 are sent to the CCD shift registers 106 and 108. Next, the CCD shift registers 106 and 108 shift and output the signal charges S1 to S10800 sequentially to the output capacitor C, and only the signal charges S1, S3, . . . , S10799 generated by the set of odd-numbered photosensors 102 are required to be acquired. For the acquisition of the signal charges S1, S3, . . . , S10799 generated by the set of the odd-numbered photosensors only, clock signal CK and reset signal RS are shown in FIG. 3.

Figure 3:
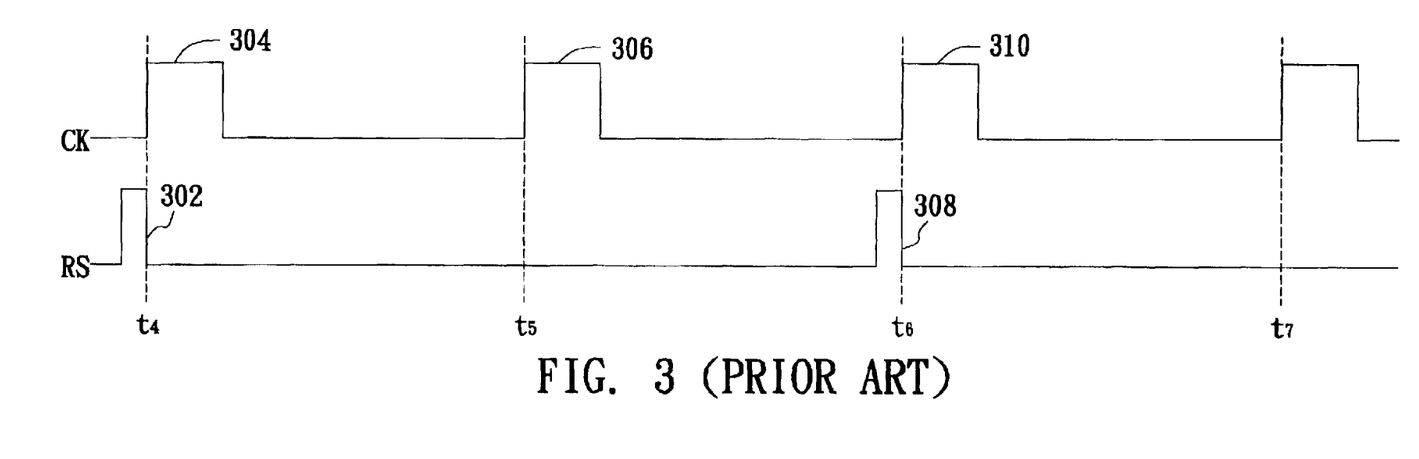
FIG. 3 (Prior Art) shows waveform diagrams of a conventional clock signal and reset signal for controlling the CCD sensing module 100 in FIG. 1 at low resolution scanning.

As shown in FIG. 3, before time $t_4$, a reset pulse 302 is inputted into the CCD sensing module 100 to reset the output capacitor C. At time $t_4$, a clock pulse 304 is inputted so that signal charge S1 is shifted to the output capacitor C. At time $t_5$, a clock pulse 306 is inputted so that signal charge S2 is shifted to the output capacitor C. Then, the output capacitor C is charged with the signal charges S1 and S2. Similarly, before time $t_6$, a reset pulse 308 is inputted for resetting the output capacitor C, thus removing the signal charges S1 and S2. As a clock pulse 310 is inputted, at time $t_6$, signal charge S3 is shifted and outputted to the output capacitor C. After time $t_7$, the signal charges S3 and S4 are stored in the output capacitor C. In this way, the above operation is repeated in sequence until all signal charges are shifted to the output capacitor C from the CCD shift registers 106 and 108. Further, the analog signal processing circuit 112 is configured to acquire the image signal based on the signal charges S1, S3, . . . , S10799, and thus the low resolution scanning at 600 dpi is achieved.

As can be observed from FIG. 3, when the CCD sensing module 100 in FIG. 1 is used to perform a low resolution scanning, e.g., scanning at 600 dpi, it consumes the same time as required in the high resolution scanning, e.g., scanning at 1200 dpi. This is because the optimal exposure time has been set to 16 ms so it is required to spend 16 ms in an exposure for the scanning at 600 dpi. Besides, for low resolution scanning, the CCD shift registers 106 and 108 are also required to shift all of the signal charges S1, S3, . . . , S10799 and S2, S4, . . . , S10800 to the output capacitor C, resulting in the same time as required in the high resolution scanning.

Thus, the conventional approach described above has the disadvantage that scanning at a low resolution uses the same time as scanning at the high resolution. During the low resolution scanning such as scanning at 600 dpi, only either the odd-numbered signal charges S1, S3, . . . , S10799, or the even-numbered signal charges S2, S4, . . . , S10800 are acquired to be the required image signal, but the time spent on performing shifting and outputting the signal charges is the same as that for the high resolution scanning such as scanning at 1200 dpi.

SUMMARY OF THE INVENTION

It is therefore an object of the invention to provide a method for controlling a charge-coupled device (CCD) sensing module. During a high resolution scanning, the method can prevent charge saturation in the CCD sensing module. During a low resolution scanning, the scanning time can be reduced, resulting in a fast scanning.

The invention achieves the above-identified object by providing a method for controlling a CCD sensing module. The CCD sensing module includes a plurality of photosensors, a CCD shift register unit, and a charge receiving unit. The photosensors are divided into two sets, including a first set of photosensors and a second set of photosensors, and are used for converting optical signals into signal charges and outputting the signal charges, in parallel, to the CCD shift register unit. The method includes the following steps. First, the first set of photosensors and the second set of photosensor are exposed, and a plurality of first signal charges obtained from the first set of photosensors and a plurality of second signal charges obtained from the second set of photosensors are stored into the CCD shift register unit. Then, the first signal charges and the second signal charges stored in the CCD shift register unit are sequentially shifted to the charge receiving unit and an image signal corresponding to the first signal charges is acquired. After that, the first set of photosensors and the second set of photosensor are exposed, and the first signal charges obtained from the first set of photosensors and the second signal charges obtained from the second set of photosensors are stored into the CCD shift register unit. Finally, the first signal charges and the second signal charges stored in the CCD shift register unit are shifted to the charge receiving unit and an image signal corresponding to the second signal charges is acquired.

Other objects, features, and advantages of the invention will become apparent from the following detailed description of the preferred but non-limiting embodiments. The description is made with reference to the accompanying drawings as described below.

DESCRIPTION OF THE PREFERRED EMBODIMENT

The invention provides a method for controlling a charge-coupled device (CCD) sensing module. The CCD sensing module includes a plurality of photosensors, at least a CCD shift register unit, and at least a charge receiving unit such as an output capacitor. The photosensors are divided into two sets, such as a set of even-numbered photosensors and a set of odd-numbered photosensors, and are used for converting optical signals into signal charges and outputting the signal charges, in parallel, to the CCD shift register unit. The method for controlling the CCD sensing module includes the steps as follows. First, step (a) is performed. In step (a), the two sets of photosensors are exposed, and even-numbered signal charges obtained from the set of even-numbered photosensors and odd-numbered signal charges obtained from the set of odd-numbered photosensors are stored into the CCD shift register unit.

Next, the method proceeds to step (b) to sequentially shift the odd-numbered and even-numbered signal charges stored in the CCD shift register unit to the charge receiving unit and acquire an image signal corresponding to the odd-numbered signal charges. Step (c) is then performed. In step (c), the two sets of photosensors again are exposed again, and the odd- and even-numbered signal charges obtained from the set of odd-numbered photosensors and the set of even-numbered photosensors are stored into the CCD shift register unit. After that, the method proceeds to step (d) to sequentially shift the odd-numbered and even-numbered signal charges stored in the CCD shift register unit to the charge receiving unit and acquire a signal corresponding to the even-numbered signal charges.

The method according to the invention is applied to the CCD sensing module 100 shown in FIG. 1 so as to give an illustration. First, step (a) is performed, where the CCD sensing module 100 is exposed. The set of even-numbered photosensors 104 is arranged in a straight line while the set of odd-numbered photosensors 102 is arranged in another straight line parallel to the straight line. In addition, the set of odd-numbered photosensors 102 and the set of even-numbered photosensors 104 are staggered in the CCD sensing module 100 so that each of the photosensors in the straight line faces towards half of one photosensor in the other straight line. When the CCD sensing module 100 is exposed, the set of odd-numbered photosensors 102 and the set of even-numbered photosensors 104 are exposed. The odd-numbered signal charges, namely, S1, S3, . . . , S10799, obtained from the set of odd-numbered photosensors 102, and the even-numbered signal charges, namely, S2, S4, . . . , S10800, obtained from the set of even-numbered photosensors 104 are stored into the CCD shift registers 106 and 108 respectively.

Next, the method proceeds to step (b) to sequentially shift the odd-numbered signal charges S1, S3, . . . , S10799 stored in the CCD shift register 106 and even-numbered signal charges S2, S4, . . . , S10800 stored in the CCD shift register 108 to the output capacitor C of the charge receiving unit 109 and to acquire an image signal corresponding to the odd-numbered signal charges S1, S3, . . . , S10799.

Figure 4:
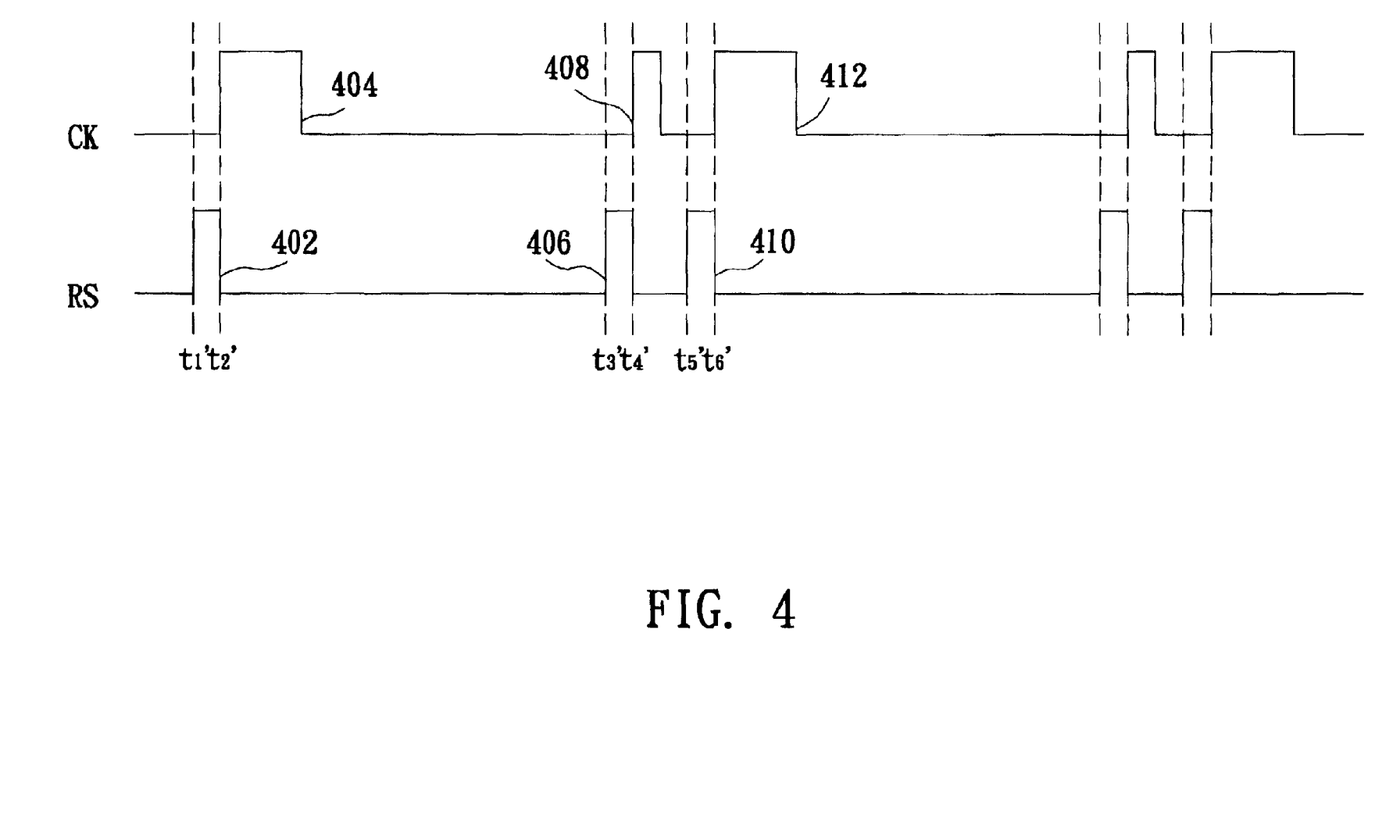
FIG. 4 is a waveform diagram illustrating a clock signal and a reset signal used to control the CCD sensing module in FIG. 1 according to a preferred embodiment of the invention.

The clock signal CK and the reset signal RS can be adjusted so that the odd-numbered signal charges S1, S3, . . . , S10799 are acquired. Referring to FIG. 4, it illustrates waveform diagrams of a clock signal and a reset signal used to control the CCD sensing module 100 in FIG. 1. At time $t_1'$, a reset pulse 402 of the reset signal RS is applied to the CCD sensing module 100 so as to reset the output capacitor C. Next, at time $t_2'$, a clock pulse 404 of the time signal CK is applied to the CCD sensing module 100. At this time, signal charge S1 is shifted from the CCD shift register 106 to the output capacitor C.

At time $t_3'$, a reset pulse 406 of the reset signal RS is applied to the CCD sensing module 100 so as to reset the output capacitor C. Then, at time $t_4'$, a clock pulse 408 of the clock signal CK is applied to the CCD sensing module 100. At this time, signal charge S2 is shifted from the CCD shift register 106 to the output capacitor C. The clock pulse 408 has a period smaller than the period of the clock pulse 404. For example, the period of the clock pulse 408 is about ⅕ of the period of the clock pulse 404.

After that, at time $t_5'$, a reset pulse 410 of the reset signal RS is applied to the CCD sensing module 100 so as to reset the output capacitor C. At this time, the signal charge S2 stored in the output capacitor C is discharged due to the reset of the output capacitor C. After time $t_5'$, a clock pulse 412 is applied to the CCD shift registers 106 and 108 so that signal charge S3 can be fed into the output capacitor C.

The time period between the clock pulses 408 and 412, namely, t6'–t4', is only about ⅕ of the time period between the clock pulses 404 and 408, namely, t4'–t2'. This is because during times t2' to t4', after signal charge S1 is fed into the output capacitor C, it takes at least 1 μs to make the voltage value of the output capacitor C maintain in a stable state for an adequate length of time so that the analog signal processing circuit 112 can acquire the required image signal from the output signal OS. During times t4' to t6', after signal charge S2 is fed into the output capacitor C, the output capacitor C is to be reset so the signal charge S2 is removed from the output capacitor C. In this embodiment according to the invention, since the image signal corresponding to the signal charge S2 is not required to be obtained, the voltage value of the output capacitor C does not need to be made in a stable state for an adequate length of time. Thus, the length of the time interval between times t4' to t6' is only required to be ⅕ of that between times t2' and t4'.

In this way, the above steps are repeated until the odd-numbered signal charges S1, S3, . . . , S10799 are successfully acquired.

After step (b) is completed, the method proceeds to step (c) to give exposure to the two sets of photosensors again. Since this step is identical to step (a), the detailed operation will not be described for the sake of brevity.

Finally, the method proceeds to step (d). In step (d), the odd-numbered signal charges S1, S3, . . . , S10799 stored in the CCD shift register 106 and the even-numbered signal charges S2, S4, . . . , S10800 stored in the CCD shift register 108 are shifted to the output capacitor C of the charge receiving unit 109 and an image signal corresponding to the even-numbered signal charges S2, S4, . . . , S10800 is acquired. Step (d) is similar to step (b) but has a difference as follows. In step (d), when the first clock pulse is inputted so that the even-numbered signal charges S2, S4, . . . , S10800 are outputted to the output capacitor C, after 1 μs, the second clock pulse is inputted and a reset pulse is applied to the CCD sensing module so as to discharge the odd-numbered signal charges S1, S3, . . . , S10799 stored in the output capacitor C. In this way, the analog signal processing circuit 112 can only acquire the image signal corresponding to the even-numbered signal charges, S2, S4, . . . , S10800.

In brief, in steps (a) and (b), the image signal corresponding to the odd-numbered signal charges, S1, S3, . . . , S10799 can be acquired and the even-numbered signal charges S2, S4, . . . , S10800 are removed. In steps (c) and (d), the image signal corresponding to the even-numbered signal charges S2, S4, . . . , S10800 can be acquired and the odd-numbered signal charges S1, S3, . . . , S10799 are removed. In this way, the entire required image signal can be obtained through two times of exposure of the CCD sensing module 100 and two times of acquisition of image signal.

The major advantage of the invention is that the time for removing the signal charges is ⅕ of the time for acquiring the image signal corresponding to the signal charges. For the CCD sensing module 100 with 5400 photosensors D in each row, it takes at least 5400×1.2 μs=6.7 ms to perform step (b). Thus, the exposure time in step (a) can be set to greater than 6.7 ms, e.g., 8 ms, as the optimal exposure time.

Since the optimal exposure time for the controlling method according to the invention may be one half of that for the conventional approach, the over-exposure and charge saturation occur in the high resolution scanning (e.g., scanning at 1200 dpi) in the conventional approach can be effectively avoided. In the conventional approach, a light tube with reduced brightness must be applied in order to avoid over-exposure and improve the scanning quality. By applying the controlling method according to the invention, a light tube with brightness in a normal level can be applied, resulting in a good scanning quality.

For a low resolution scanning, such as scanning at 600 dpi, steps (a) and (b) of the method described above can be used to complete the low resolution scanning. For example in a low resolution scanning with an optimal exposure time of 8 ms, since exposure is required for one time only, the time for the low resolution scanning will be only 8 ms to obtain the required image signal. As compared with the conventional approach where 16 ms is required, the controlling method according to the invention can reduce the time of scanning, resulting in a fast scanning.

Figure 5A:
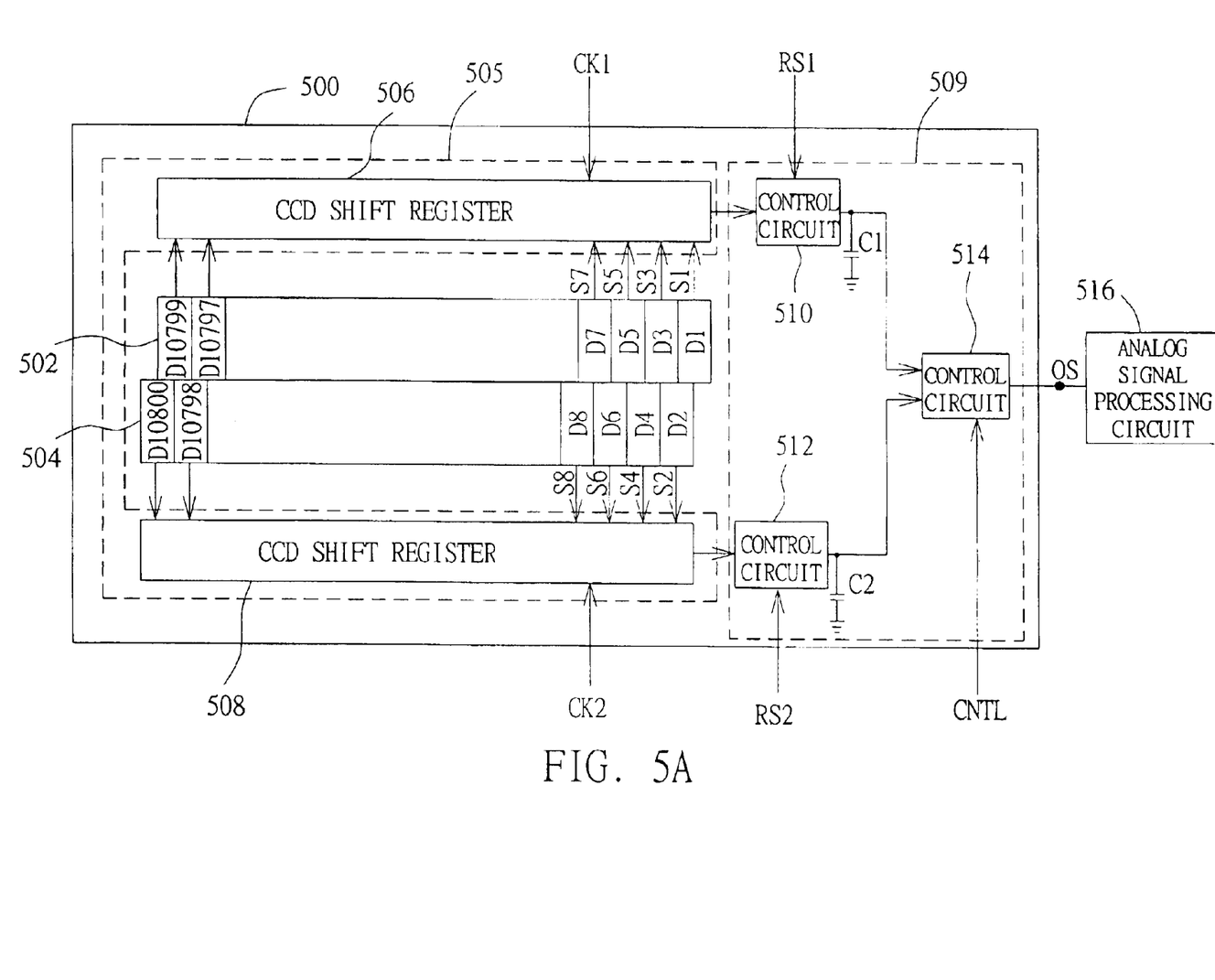
FIG. 5A illustrates a CCD sensing module employing a staggered structure with two output capacitors.

Further, the controlling method according to the invention can be applied to CCD sensing modules employing different structures as well as the CCD sensing module 100 that employs a staggered sensor structure. Referring to FIG. 5A, it illustrates a CCD sensing module 500 employing a staggered structure and two output capacitors. In FIG. 5A, the CCD sensing module 500 includes a set of odd-numbered photosensors 502, a set of even-numbered photosensors 504, which are arranged in a staggered sensor structure, a CCD shift register unit 505, and a charge receiving unit 509. The CCD shift register unit 505 includes CCD shift registers 506 and 508. The charge receiving unit 509 includes two charge receiving devices and a number of control circuits, for example, output capacitors C1, C2, the control circuits 510, 512, and 514. Clock signals CK1 and CK2 are fed into the CCD shift registers 506 and 508 respectively. Reset signals RS1 and RS2 are fed into the control circuits 510 and 512 respectively so as to control the output capacitors C1 and C2. The output capacitors C1 and C2 are coupled to the control circuit 514, which is controlled by a control signal CNTL. The control circuit 514 is used for outputting an output signal OS to an analog signal processing circuit 516.

The method for controlling the CCD sensing module 500 in FIG. 5A is as follows. First, step (a) is performed, the set of odd-numbered photosensors 502 and the set of even-numbered photosensors 504 are exposed. The odd-numbered signal charges, namely, S1, S3, . . . , S10799, obtained from the set of odd-numbered photosensors 502, and the even-numbered signal charges, namely, S2, S4, . . . , S10800, obtained from the set of even-numbered photosensors 504 are stored into the CCD shift registers 506 and 508 respectively.

Figure 5B:
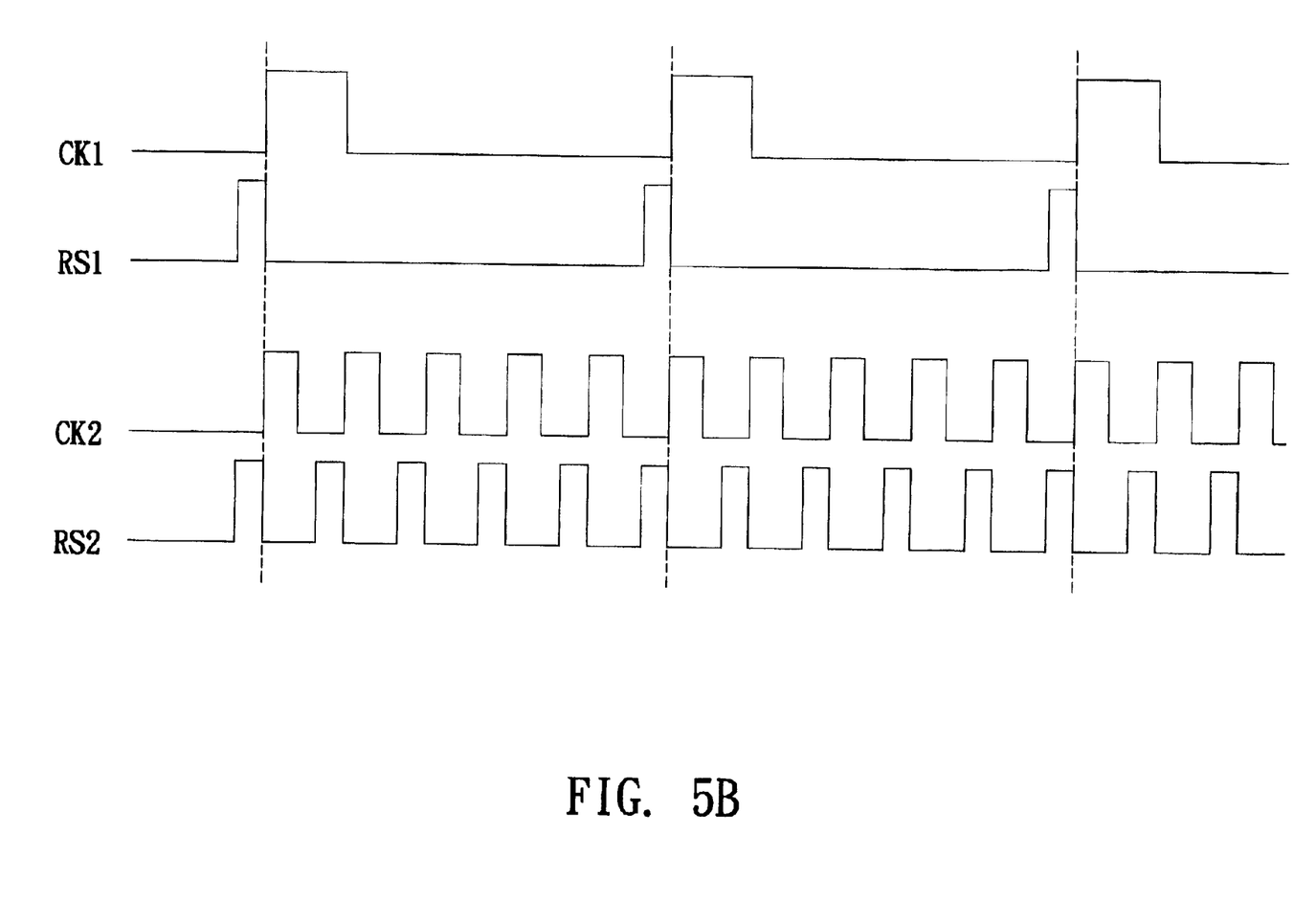
FIG. 5B shows waveform diagrams of the clock signal and reset signal used after the first exposure of the CCD sensing module in FIG. 5A is made.

Next, the method proceeds to step (b). In step (b), the odd-numbered signal charges S1, S3, . . . , S10799 stored in the CCD shift register 506 are shifted to the output capacitor C1, and the even-numbered signal charges S2, S4, . . . , S10800 stored in the CCD shift register 508 are shifted to the output capacitor C2 and an image signal corresponding to the odd-numbered signal charges S1, S3, . . . , S10799 is acquired. FIG. 5B shows waveform diagrams of clock signals CK1, CK2 and reset signals RS1 and RS2 used after the first exposure of the CCD sensing module in FIG. 5A is made. During step (b), the odd-numbered signal charges are shifted to the output capacitor C1 by the help of the clock signal CK1 and the even-numbered signal charges are shifted to the output capacitor C2 by the help of the clock signal CK2. According to the invention, the period of the clock signal CK2 can be set to ⅕ of that of the clock signal CK1 so that the image signal corresponding to the odd-numbered signal charges S1, S3, . . . , S10799 is acquired and the even-numbered signal charges S2, S4, . . . , S10800 are discharged. For example, if the period of the clock signal CK1 is 1 μs, the period of the clock signal CK2 is set to 0.2 μs and the necessary operations can be performed.

Next, step (c) is then performed. In step (c), the set of odd-numbered photosensors 502 and the set of even-numbered photosensors 504 are exposed again, and the odd- and even-numbered signal charges obtained from the two sets of photosensors are stored into the CCD shift registers 506 and 508 respectively.

Figure 5C:
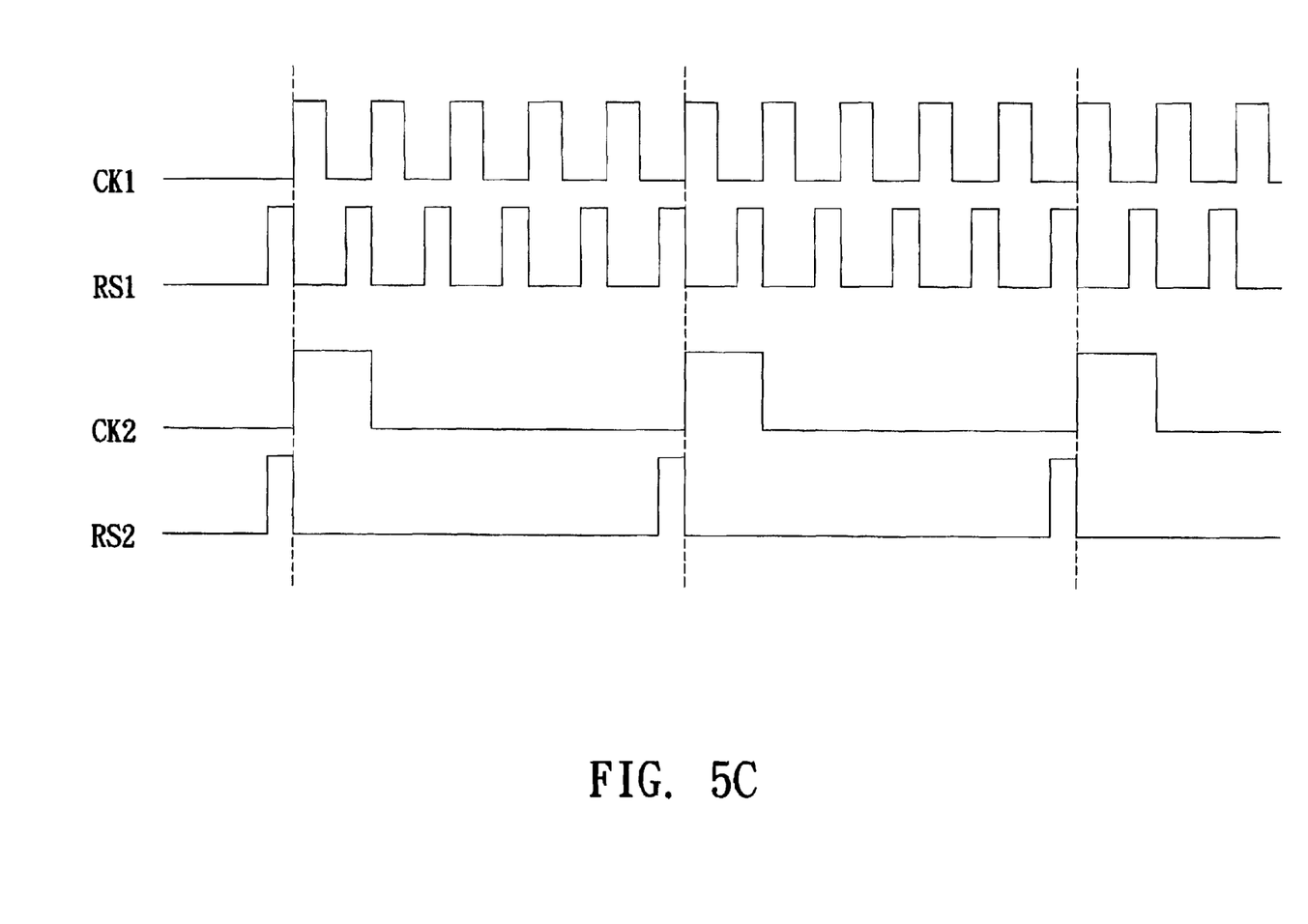
FIG. 5C shows waveform diagrams of the clock signal and reset signal used after the second exposure of the CCD sensing module in FIG. 5A is made.

Finally, the method proceeds to step (d). In step (d), the odd-numbered signal charges S1, S3, . . . , S10799 stored in the CCD shift register 506 are sequentially shifted to the output capacitor C1, and the even-numbered signal charges S2, S4, . . . , S10800 stored in the CCD shift register 508 are sequentially shifted to the output capacitor C2 and an image signal corresponding to the even-numbered signal charges S2, S4, . . . , S10800 is acquired. Referring to FIG. 5C, it shows the waveform diagrams of the clock signals CK1, CK2, reset signals RS1 and RS2 used in step (d) after the second exposure of the CCD sensing module in FIG. 5A is made. According to the invention, the period of the clock signal CK1 can be set to ⅕ of that of the clock signal CK2 so that the image signal corresponding to the even-numbered signal charges S2, S4, . . . , S10800 is acquired and the odd-numbered signal charges S1, S3, . . . , S10799 are discharged. For example, the period of the clock signal CK2 is set to 0.2 μs and the period of the clock signal CK2 is set to 1 μs so that the necessary operations can be performed.

The above method can be applied to scanning at a high resolution. As described previously, when a low resolution scanning is required, steps (a) and (b) of the method can be applied to complete that scanning.

Figure 6:
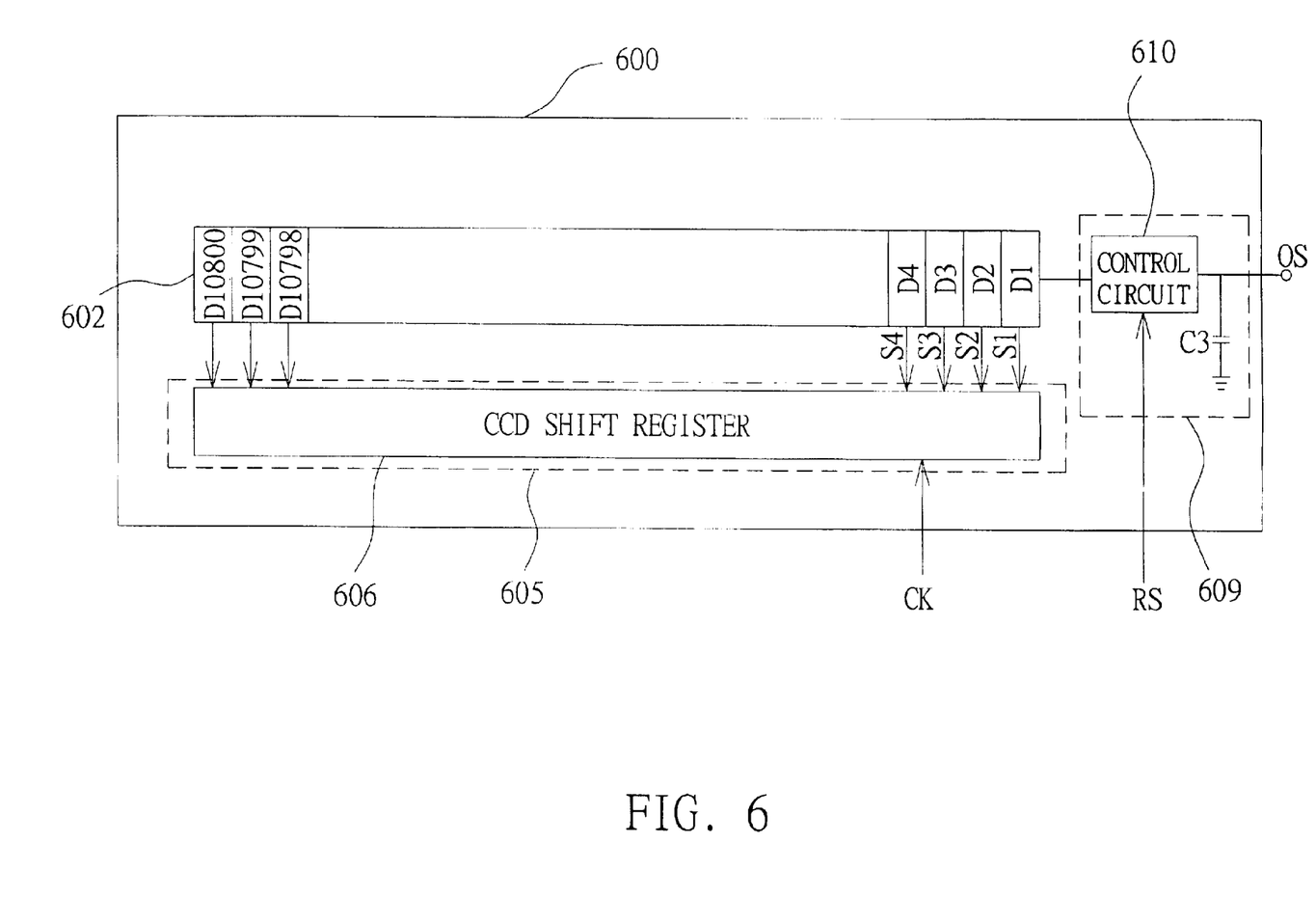
FIG. 6 shows a CCD sensing module with a single array sensor structure.

Moreover, the invention can be applied to a CCD sensing module 600 employing a single array sensor structure as shown in FIG. 6. The CCD sensing module 600 includes a photosensor set 602, a CCD shift register unit 605, and a charge receiving unit 609. The CCD shift register unit 605 includes a CCD shift register 606 while the charge receiving unit 609 includes a control circuit 610 and charge receiving device such as an output capacitor C3. The method for controlling the CCD sensing module 600 is as follows. First, step (a) is performed. The photosensor set 602 is exposed, and signal charges S1, S2, S3, . . . , S10799, S10800 obtained from the exposed photosensor set 602 are stored into the CCD shift register 606.

Next, the method proceeds to step (b), in which the signal charges S1, S2, S3, . . . , S10799, S10800 stored in the CCD shift register 606 are sequentially shifted to the output capacitor C3 and the image signal corresponding to the odd-numbered signal charges S1, S3, . . . , S10799 is acquired. The clock signal CK and the reset signal RS used in step (b) is shown in FIG. 4. By the help of the clock signal CK and reset signal, the image signal corresponding to the odd-numbered signal charges S1, S3, . . . , S10799 is acquired and the even-numbered signal charges S2, S4, . . . , S10800 are discharged.

After that, step (c) is performed so that the photosensor set 602 is exposed again and the signal charges S1 to S10800 are stored into the CCD shift register 606.

Finally, step (d) is performed, in which the signal charges S1 to S10800 stored in the CCD shift register 606 are sequentially shifted to the output capacitor C2 and the image signal corresponding to the even-numbered signal charges S2, S4, . . . , S10800 is acquired.

As described above, all of the photosensors are divided into two sets, i.e., the odd-numbered photosensor set and the even-numbered photosensor set, for illustration. However, the method for controlling a CCD sensing module can be further applied to the photosensors divided into N sets, where N is integer greater than two. The method is as follows.

First, the method proceeds to step (a') to set i to one, where i is a positive integer. Step (b') is then executed to make exposure on the photosensors from the first set of photosensors to the N-th set of photosensors, and first signal charges to N-th signal charges obtained from the first set of photosensors to the N-th set of photosensors are stored into the CCD shift register unit. Next, step (c') is performed to sequentially shift the first signal charges through the N-th signal charges stored in the CCD shift register unit to the charge receiving unit and acquire an image signal corresponding to the i-th signal charges. After that, step (d') is performed to increment i by one. Finally, step (e') is executed to repeat from step (b') to step (d') until i is greater than N.

As disclosed above, the method for controlling a CCD sensing module can prevent charge saturation in the CCD sensing module during a high resolution scanning and reduce the scanning time during a low resolution scanning. According the invention, an optimal amount of exposure for a CCD sensing module is achieved by considering the structure employed by the CCD sensing module having single set of photosensors or reduced resolution, and acquiring required image signals in a number of times. In this way, the control of the high-resolution CCD sensing module is achieved. As a whole, scanning time is reduced and an optimal signal-to-noise ratio can be obtained.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling a charge-coupled device (CCD) sensing module, the CCD sensing module comprising a plurality of photosensors, a CCD shift register unit, and a charge receiving unit, wherein the photosensors are divided into two sets of photosensors, including a first set of photosensors and a second set of photosensors, and are used for converting optical signals into signal charges and outputting the signal charges, in parallel, to the CCD shift register unit, the method comprising the steps of:

exposing the first set of photosensors and the second set of photosensors, and storing a plurality of first signal charges obtained from the first set of photosensors and a plurality of second signal charges obtained from the second set of photosensors into the CCD shift register unit;

sequentially shifting the first signal charges under the control of a plurality of first clock pulses and the second signal charges under the control of a plurality of second clock pulses from the CCD shift register unit to the charge receiving unit, and acquiring an image signal corresponding to the first signal charges, wherein the first clock pulses and the second clock pulses are applied to the CCD sensing module alternatively, a period of the second clock pulse is smaller than a period of the first clock pulses, and a first reset pulse is applied before each of the first clock pulses and the second clock pulses is applied to reset the charge receiving unit;

exposing the first set of photosensors and the second set of photosensors, and storing a plurality of third signal charges obtained from the first set of photosensors and a plurality of fourth signal charges obtained from the second set of photosensors into the CCD shift register unit; and sequentially shifting the third signal charges under the control of a plurality of third clock pulses and the fourth signal charges under the control of a plurality of fourth clock pulses from the CCD shift register unit to the charge receiving unit and acquiring an image signal corresponding to the fourth signal charges, wherein the third clock pulses and the fourth clock pulses are applied to the CCD sensing module alternatively, a period of the third clock pulse is smaller than a period of the fourth clock pulses, and a second reset pulse is applied before each of the third clock pulses and the fourth clock pulses is applied to reset the charge receiving unit.

2. A method according to claim 1, wherein the CCD shift register unit comprises a first shift register and a second shift register, the charge receiving unit comprises an output capacitor, the first set of photosensors is a set of odd-numbered photosensors, the second set of photosensors is a set of even-numbered photosensors, the set of odd-numbered photosensors and the set of even-numbered photosensors are staggered, the signal charges of the photosensors of the first set of photosensors are inputted to the first CCD shift register, and the signal charges of the photosensors of the second set of photosensors are inputted to the second CCD shift register.

3. A method according to claim 1, wherein the period of the second clock pulses is $\frac{1}{5}$ of the period of the first clock pulses, and the period of the third clock pulses is $\frac{1}{5}$ of the period of the fourth clock pulses.

4. A method according to claim 1, wherein the CCD shift register unit comprises a first shift register and a second shift register, the charge receiving unit comprises a first output capacitor and a second output capacitor, the first set of photosensors is a set of odd-numbered photosensor, the second set of photosensors is a set of even-numbered photosensors, the set of odd-numbered photosensors and the set of even-numbered photosensors are staggered, the signal charges of the photosensors of the first set of photosensors are inputted to the first CCD shift register, and the signal charges of the photosensors of the second set of photosensors are inputted to the second CCD shift register, the first signal charges stored in the first CCD shift register are shifted to the first output capacitor, and the second signal charges stored in the second CCD shift register are shifted to the second output capacitor.

5. A method according to claim 1, wherein the CCD shift register unit comprises a shift register, the charge receiving unit comprises an output capacitor, the CCD sensing module is a CCD sensing module employing a single array sensor structure, the first set of photosensors is a set of odd-numbered photosensors, and the second set of photosensors is a set of even-numbered photosensors.

6. A method for controlling a charge-coupled device (CCD) sensing module, the CCD sensing module being capable of being used in low resolution scanning, the CCD sensing module comprising a plurality of photosensors, a CCD shift register unit, and a charge receiving unit, wherein the photosensors are divided into two sets of photosensors, including a first set of photosensors and a second set of photosensors, and are used for converting optical signals into signal charges and outputting the signal charges, in parallel, to the CCD shift register unit, the method comprising the steps of:

exposing the first set of photosensors and the second set of photosensors; and storing a plurality of first signal charges obtained from the first set of photosensors and a plurality of second signal charges obtained from the second set of photosensors into the CCD shift register unit; and sequentially shifting the first signal charges under the control of a plurality of first clock pulses and the second signal charges under the control of a plurality of second clock pulses from the CCD shift register unit to the charge receiving unit and acquiring an image signal corresponding to the first signal charges wherein the first clock pulses and the second clock pulses are applied to the CCD sensing module alternatively, a period of the second clock pulse is smaller than a period of the first clock pulses, and a reset pulse is applied before each of the first clock pulses and the second clock pulses is a applied to reset the charge receiving unit.

7. A method for controlling a charge-coupled device (CCD) sensing module, the CCD sensing module comprising a plurality of photosensors, a CCD shift register unit, and a charge receiving unit, wherein the photosensors are divided into N sets, including a first set of photosensors to an N-th set of photosensors, and are used for converting optical signals into signal charges and outputting the signal charges, in parallel, to the CCD shift register unit, the method comprising the steps of:

(a) setting i to one, where i is a positive integer;

(b) exposing the photosensors from the first set of photosensors to the N-th set of photosensors, and storing a plurality of first signal charges to a plurality of N-th signal charges obtained from the first set of photosensors to the N-th set of photosensors into the CCD shift register unit; and (c) sequentially shifting the first signal charges through the N-th signal charges from the CCD shift register unit to the charge receiving unit under the control of a plurality of first to N-th clock pulses respectively, and acquiring an image signal corresponding to the i-th signal charges, wherein the first to N-th clock pulses are applied to the CCD sensing module sequentially, a period of the i-th clock pulse is larger than periods of other clock pulses, a first reset pulse is applied before each of the first to N-th clock pulses is applied;

(d) adding one to i; and (e) repeating from step (b) to step (d) until i is greater than N.

* * * * *